United States Patent [19]

Groppo, Jr. et al.

[11] Patent Number: 5,817,230
[45] Date of Patent: Oct. 6, 1998

[54] METHOD FOR IMPROVING THE POZZOLANIC CHARACTER OF FLY ASH

[75] Inventors: John G. Groppo, Jr., Wilmore; Thomas L. Robl, Lexington, both of Ky.; Charles J. McCormick, Atlanta, Ga.

[73] Assignee: University of Kentucky Research Foundation, Lexington, Ky.

[21] Appl. No.: 921,296

[22] Filed: Aug. 29, 1997

[51] Int. Cl.$^6$ .................................. B03B 9/04; B03B 7/00
[52] U.S. Cl. ........................... 209/166; 209/12.1; 209/13; 209/17; 209/459; 106/405; 106/DIG. 1; 106/705
[58] Field of Search ............................... 209/12.1, 13, 17, 209/164, 166, 459; 106/405, DIG. 1, 705

[56] References Cited

U.S. PATENT DOCUMENTS

| | | |
|---|---|---|
| 1,984,386 | 12/1934 | Tschudy . |
| 2,431,560 | 11/1947 | Humphreys . |
| 2,835,387 | 5/1958 | Fontein . |
| 3,794,250 | 2/1974 | Brewer . |
| 3,908,912 | 9/1975 | Irons et al. . |
| 4,121,945 | 10/1978 | Hurst . |
| 4,323,449 | 4/1982 | Pelletier . |
| 4,388,181 | 6/1983 | Rainis et al. . |
| 4,392,981 | 7/1983 | Corbeels . |
| 4,412,839 | 11/1983 | Taylor . |
| 4,426,282 | 1/1984 | Aunsholt . |
| 4,652,433 | 3/1987 | Ashworth et al. . |
| 4,669,397 | 6/1987 | Galgana et al. . |
| 4,686,031 | 8/1987 | Lisowyj et al. . |
| 4,883,586 | 11/1989 | Bierman et al. . |
| 4,961,843 | 10/1990 | Lewis . |
| 5,047,145 | 9/1991 | Hwang . |
| 5,227,047 | 7/1993 | Hwang . |
| 5,452,805 | 9/1995 | Robertson et al. . |
| 5,456,363 | 10/1995 | Groppo et al. . |
| 5,535,892 | 7/1996 | Moorhead et al. . |

Primary Examiner—Thomas M. Lithgow
Attorney, Agent, or Firm—King and Schickli

[57] ABSTRACT

A method for improving the pozzolanic character of fly ash includes the steps of first hydraulically classifying and then flotation separating the fly ash in order to reduce particle size distribution and remove carbon. The method also includes the steps of spiral concentrating separated coarse particles to recover iron, pyrite and marcasite and screening the fly ash to remove ultra-light carbon and plant debris.

6 Claims, 3 Drawing Sheets

METHOD FOR IMPROVING THE POZZOLANIC CHARACTER OF FLY ASH

TECHNICAL FIELD

The present invention relates generally to a method of improving the pozzolanic character of fly ash so that it may be utilized as a more effective pozzolanic admix in concrete.

BACKGROUND OF THE INVENTION

It is well known in the art that the beneficiation of fly ash is frequently required in order to meet end use specifications as prescribed in ASTM procedures C-618, entitled "Standard Specifications for Fly Ash or Calcined Natural Pozzolan for use as a Mineral Admixture in Portland Cement Concrete". Specification C-618 sets three critical criteria that must be met before fly ash may be utilized as an admix in concrete. These are loss on ignition, fineness and strength.

The total maximum loss on ignition (LOI) that is allowed is 6%. Almost all LOI is attributable to unburned carbon in the fly ash. This carbon absorbs air entrainment admixtures and must be limited. The problem with high LOI fly ash will increase in the future since low $NO_x$. producing burners now favored by power production facilities encourage carbon carryover into the ash.

With respect to fineness, the C-618 specifies that no more than 34% of the fly ash may be retained by a 325 mesh (45 $\mu$m) screen.

Finally, a mineral strength index (SI) of 75% is also required. The strength index is the ratio of the compressive strength of a standard block made from a standard mix of cement that does not use fly ash to the compressive strength of a block made with 20% fly ash in replacement for part of the cement. The SI is measured at 7 days and if not passed, again at 28 days. If the SI is not met at 28 days, the material fails.

The fineness and strength criteria are important, related parameters. This is particularly true since small particles are more reactive.

In the manner of explanation, the role of pozzolan in portland cement concrete is to react with excess portlandite ($Ca(OH)_2$) to form cementitious calcium alumino silicates. In doing so the pozzolan improves the strength of the concrete over the longer turn, shrinks pores and makes $Ca(OH)_2$ unavailable for deleterious reactions involving sulfate, chloride and carbonate ions.

Specifically, the glassy portion of the fly ash does not begin to dissolve until the pH in the cement paste builds to high levels, generally 12.5 or above. The products of the dissolution of the fly ash then react with portlandite to form calcium alumino silicates. The products of the reaction do not migrate far since they generally nucleate on the pozzolan surfaces or in the nearby interstices. Accordingly, the surface area of the pozzolan exerts overall control on the rate of reaction and indirectly on the strength index. This is illustrated in FIG. 1 which plots the cumulative surface area of some fly ash samples from ponds verses particle size. Further, it has been determined that for most fly ashes 95% or more of the surface is found in particles smaller than 15 $\mu$m. Both pozzolan surface area and the percent of particles less than 15 $\mu$m are strongly correlated with the strength index (note FIG. 2).

From the above, it should be appreciated that it is generally necessary to remove carbon and reduce the mean particle size in order to provide a fly ash material that is truly useful as a pozzolanic admixture in portland cement concrete. One state of the art procedure for processing fly ash is disclosed in U.S. Pat. No. 4,652,433 to Ashworth et al. In this prior art procedure the fly ash is first screened and the dry +200 mesh carbon enriched ash fraction is then fed to a separation unit for wet mixing followed by gravity separation. Specifically, water and a surfactant are added to the fly ash and then the resulting slurry is allowed to settle. Cenospheres float to the surface of the separator and are skimmed off while the carbon-containing material settles. The settled material is then ground and fed to a froth flotation unit whereby the carbon and fly ash are separated and the carbon is recovered. Next the relatively carbon free fly ash is subjected to dry magnetic separation in order to remove iron-containing particles.

While such a state of the art procedure is effective in enhancing the pozzolatic qualities of the fly ash for subsequent use in portland cement concrete, the procedure has a number of shortcomings. First, it should be appreciated that the fine screens necessary for completion of the screening step wear out quickly. Accordingly, this is a high maintenance procedure requiring costly equipment replacement and significant processing down time. Additionally, the magnetic separation step also requires the use of relatively capital intensive equipment with relatively high operating costs that also require significant maintenance due to the adverse conditions of the work environment. Accordingly, a need is identified for an improved method or procedure for improving the pozzolanic character of fly ash so that it is a commercially useful product as an admixture for portland cement concrete.

SUMMARY OF THE INVENTION

Accordingly, it is a primary object of the present invention to provide a simple, cost-effective means of processing fly ash for subsequent use as a pozzolanic admixture material overcoming the above-described limitations and disadvantages of the prior art.

Another object of the present invention is to provide a method for efficiently removing coarse particles and carbon from fly ash whereby the mean particle size and carbon content of the fly ash are reduced and the resulting pozzolanic character of the fly ash is enhanced.

Still another object of the present invention is to provide a means for removing coarse particles, iron, pyrite and marcasite as well as carbon from fly ash so that any fly ash, including those that do not initially meet either strength or size criteria may be cost effectively processed into a marketable high quality pozzolan that exceeds minimum ASTM criteria.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved method is provided for improving the pozzolanic character of fly ash. The method comprises the step of hydraulically classifying the fly ash in order to substantially remove all the coarse carbon particles greater than approximately 75 microns and more preferably 45 microns and flotation separating the resulting fly ash after hydraulic classification in order to remove any remaining carbon.

In accordance with yet another aspect of the present invention, the method includes the removing of light carbon and plant debris carryover following hydraulic classification. This is done utilizing a high capacity screen.

Still further, the method includes the recovering of iron, pyrite and marcasite particles by means of spiral classifiers. Advantageously, this allows iron, pyrite and marcasite particle removable without the necessity of utilizing magnetic separation equipment and, accordingly, the separation is completed with simple, less capital intensive equipment requiring less maintenance and system down time.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 3:
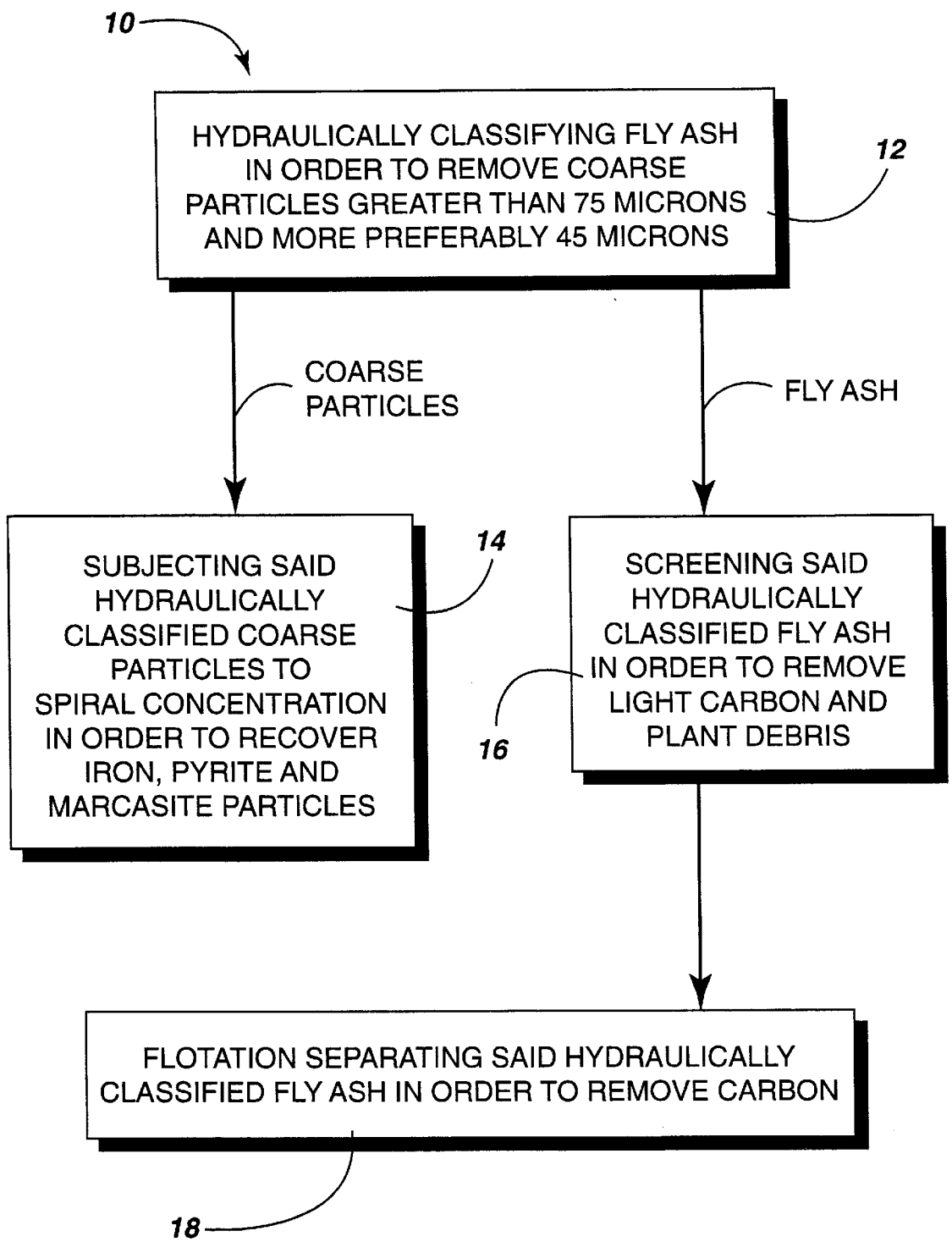
FIG. 3 is a block diagram illustrating the steps of the present invention.

Reference is now made to FIG. 3 which is a schematic block diagram illustrating the method 10 of the present invention for improving the pozzolanic character of fly ash. Advantageously, the present method may be utilized to efficiently and effectively produce a high quality pozzolan from any class F fly ash whether that fly ash is ponded, land filled or dry. Of course, the ability to process ponded material allows pozzolanic production to be controlled by normal market demand rather than by the rate of power generation as it is at the present. This represents a major advantage to the present process. Additionally, the resulting enhanced pozzolan has the capacity to command a higher price in the cement admixture market thereby significantly improving the economics of not only fly ash processing by means of the present invention but also overall power generation by the utility companies.

The first step 12 of the present method is hydraulically classifying the fly ash in order to remove coarse particles greater than 75 microns and more preferably greater than 45 microns. An apparatus and method for hydraulic classification is generally disclosed and described in U.S. Pat. No. 4,961,843 to Lewis, the full disclosure of which is incorporated herein by reference. Specifically, dry, land filled or ponded fly ash is conveyed or pumped to a mixing vessel including an agitator and a water supply pipe. There a slurry of raw fly ash and water is prepared having a weight ratio of water to fly ash of between 5.0–30.0. The resulting slurry is then processed in a hydraulic classifier in the manner described in U.S. Pat. No. 4,961,843 to Lewis.

Figure 1:
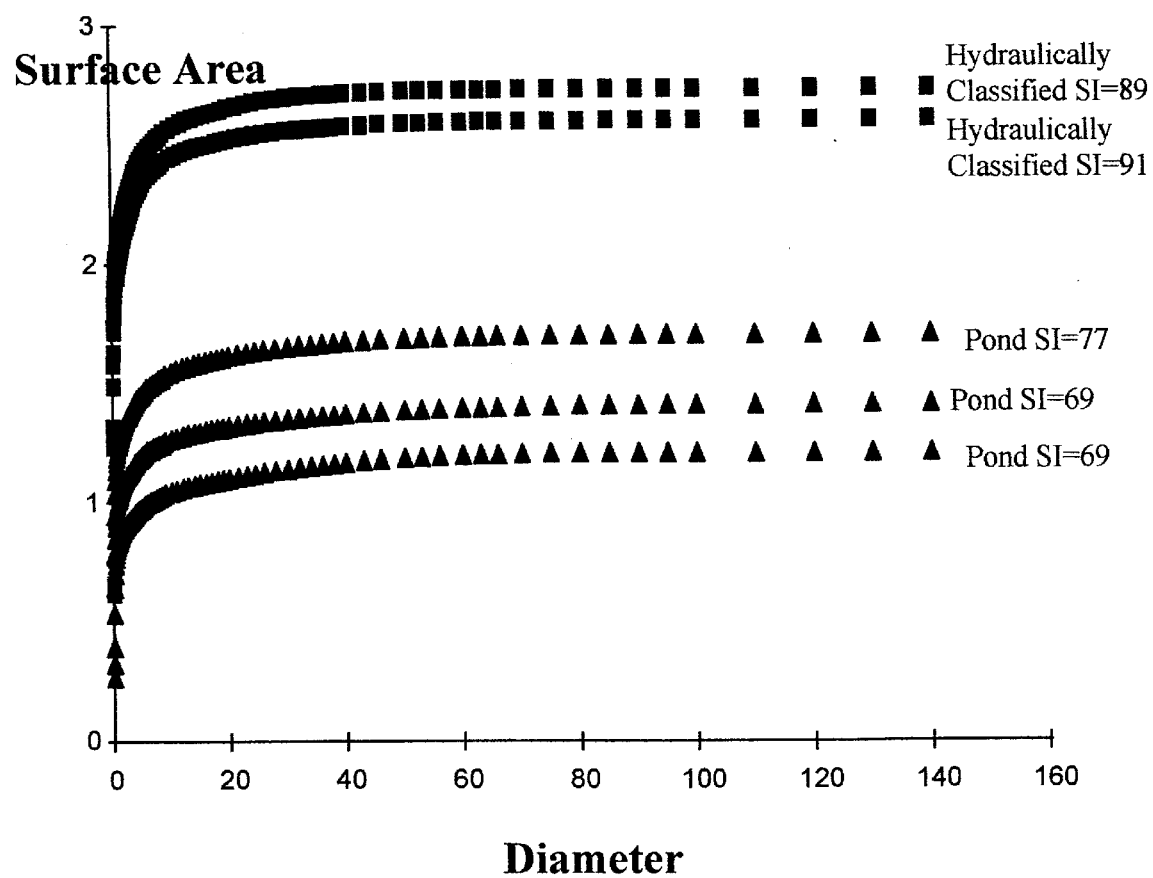
FIG. 1 is a graphical representation plotting fly ash particle size in $\mu m$ versus area in $\mu m^2/\mu m^3$ for pond and hydraulically classified fly ash.
Figure 2:
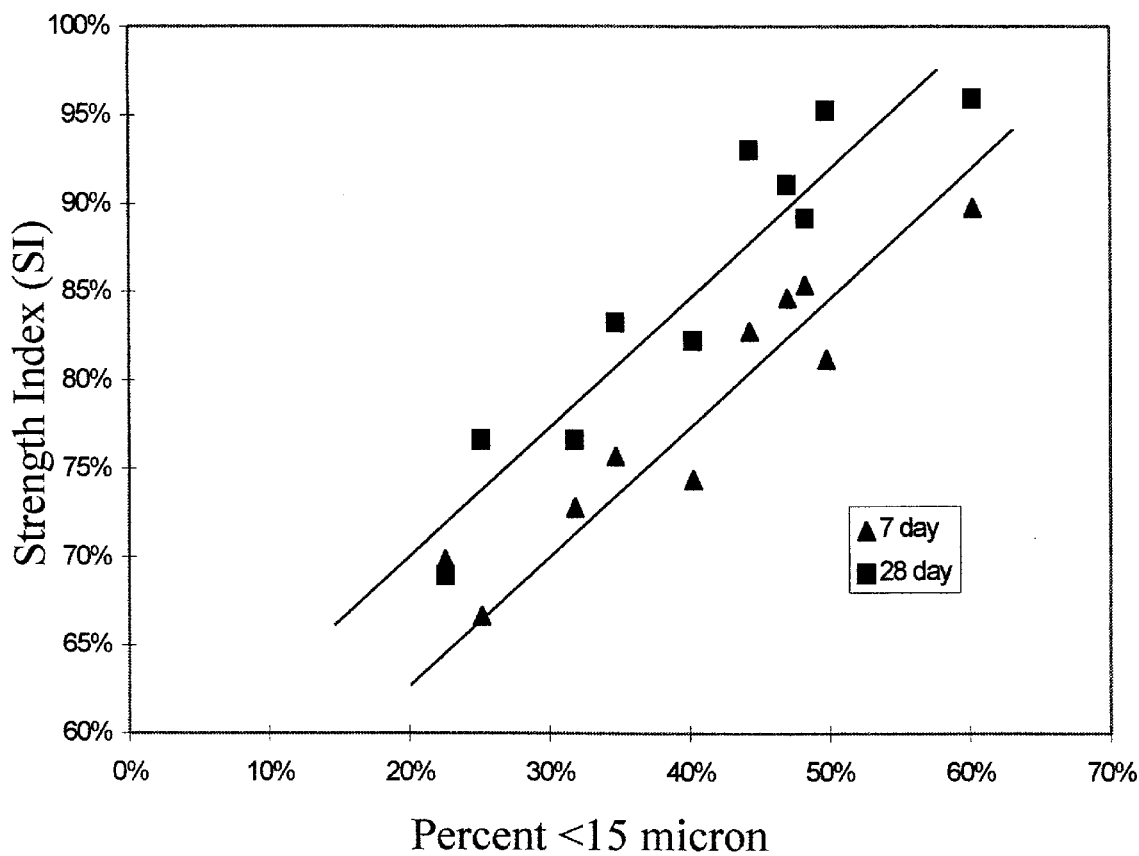
FIG. 2 is a graphical representation plotting the percentage of particles smaller than 15 $\mu m$ verses 7 and 28 day SI for fly ash samples.

Advantageously, hydraulic classification is far more efficient than presently utilized screening operations such as described in U.S. Pat. No. 4,652,433 to Ashworth et al. Hydraulic classification equipment also functions over a significantly longer service life with far less maintenance then fine screens which are prone to rapid wear and require periodic replacement at a cost of significant downtime. Further, hydraulic classification is capable of classifying at much finer sizes than conventional screening equipment. As a result, the surface area of the resulting processed fly ash is increased and, therefore, the resulting fly ash produces a concrete of improved SI. This is illustrated in FIG. 1 and Table 1 which compares the strength data from fly ash which was subjected to hydraulic classification before processing by froth flotation with fly ash that was not. Clearly, hydraulic classification greatly improves both the 7 day and 28 day strength of material. The hydraulic classification is very efficient and effectively removes substantially all of the coarse particles including a significant percentage of the overall total of iron, pyrite and marcasite containing particles as well as the coarse carbon particles.

TABLE 1

Comparison of SI for fly ash beneficiation by froth flotation with and without hydraulic classification.
All samples pass ASTM C-618 LOI and fineness criteria.

|  | 7 day SI | 28 day SI | % < 15 $\mu m$ |
|---|---|---|---|
| | Flotation Without Classification | | |
| A-SC | 69.8% | 68.9% | 23% |
| B-SC | 66.7 | 76.6% | 25% |
| C-EK | 75.7% | 83.3% | 35% |
| | Flotation With Hydraulic Classification | | |
| A-SC | 85.4% | 89.2% | 48% |
| B-SC | 84.7% | 91.1% | 47% |
| C-EK | 89.8% | 95.9% | 60% |

*NOTE: Strength Activity Index Minimum as per ASTM C-618 is 75%

Next is the step 14 of subjecting the coarse particles previously separated from the fly ash to spiral concentration. This is done in order to recover substantially all the iron, pyrite and marcasite particles. Specifically, the coarse particles recovered from the hydraulic classifier are charged into a spiral classifier such as described in, for example, U.S. Pat. Nos. 2,431,560 to Humphreys and 5,452,805 to Robertson et al. The full disclosure in these patents is incorporated herein by reference.

Advantageously, by the combined efforts of hydraulic classification and spiral concentration, substantially all the iron, pyrite and marcasite containing particles are removed from the fly ash and recovered. This is done without utilizing magnetic field generation equipment which is generally characterized by relatively high initial capital investment and high operating costs.

After subjecting the fly ash to spiral concentration there follows the screening 16 of the fine particles of hydraulically classified fly ash in order to remove ultra-light carbon and vegetative plant debris carried over from the classifier. Removal of these materials not only reduces the LOI but also again enhances the fineness and SI of the resulting fly ash material. Preferably, a screen size of 60–100 mesh is utilized. Since the coarse carbon particles as well as the iron, pyrite and marcasite containing particles have all already been removed from the fly ash, the screen is not subjected to heavy wear and functions properly over a longer service life before requiring replacement.

Next in the method 10 is the step 18 of flotation separating the hydraulically classified fly ash in order to remove any remaining carbon. Substantially any floatation separation procedure may be utilized. Preferably, however, the method and apparatus described in U.S. Pat. No. 5,456,363 to Groppo et al. (the full disclosure of which is incorporated herein by reference) are employed. Thus, flotation reagent comprising a mixture of fuel oil and petroleum sulfonate is added to the fly ash slurry that has previously undergone hydraulic classification and screening. This flotation reagent renders the carbon hydrophobic. Accordingly, when the slurry is aerated, the carbon rises and is recovered separate from the now substantially carbon free fly ash.

Advantageously, by employing hydraulic classification prior to flotation the coarse, difficult to float carbon material has already been removed. Thus, significantly less flotation reagent is required during flotation. As a result, flotation processing costs are reduced and a significantly cleaner, carbon-free fly ash product results.

In summary, numerous benefits result from employing the concepts of the present invention. Hydraulic classification is employed prior to flotation in order to effectively and efficiently remove coarse material and provide control over the size distribution of the final product. This insures the production of a high quality pozzolan meeting or exceeding the fineness and strength index parameters set forth in specification C-618. Together, hydraulic classification and spiral concentration function to remove and recover substantially all of the iron, pyrite and marcasite particles. This is a significant advantage since this removal and recovery is accomplished without the utilization of magnetic separation means and, accordingly, removal and recovery is more cost efficient. Further, more complete removal is achieved and, accordingly, any concrete produced with the fly ash product of the present invention will not be subject to staining which commonly results in fly ash containing concrete as a result of the oxidation of residual iron, pyrite and marcasite contaminants.

Finally, the loss of ignition parameter of concrete produced utilizing the fly ash product of the present method is significantly reduced below the criteria set in specification C-618. This is accomplished by first removing coarse carbon by means of hydraulic classification then ultra-light carbon by screening followed by the remaining carbon by means of flotation separation. Together these three processing steps remove substantially all of the carbon from the fly ash.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A method for improving pozzolanic character of fly ash, comprising:

hydraulically classifying said fly ash in order to substantially remove coarse particles greater than 75 microns; and subjecting fine particles from the hydraulic classifying to flotation to remove remaining carbon as a float fraction from a substantially carbon free fly ash having an improved pozzolanic character.

2. The method of claim 1, including screening said fly ash following hydraulic classification in order to remove ultralight carbon particle and plant debris carryover.

3. The method of claim 1, including subjecting said coarse particles to spiral concentration following hydraulic classification in order to remove iron, pyrite and marcasite.

4. A method for improving pozzolanic character of fly ash, comprising:

hydraulically classifying said fly ash in order to substantially remove coarse particles greater than 45 microns; and subjecting fine particles of fly ash from the hydraulic classifying to flotation to remove remaining carbon as a float fraction from a substantially carbon free fly ash having improved pozzolanic character.

5. The method of claim 4, including screening said fly ash following hydraulic classification in order to remove ultralight carbon particle and plant debris carryover.

6. The method of claim 4, including subjecting said coarse particles to spiral concentration following hydraulic classification in order to remove iron, pyrite and marcasite.

* * * * *